Dec. 5, 1939.   K. G. ÖSTBERG   2,182,162
MACHINE FOR CUTTING OR SHEARING METAL PLATES AND THE LIKE
Filed Dec. 8, 1937   4 Sheets-Sheet 1
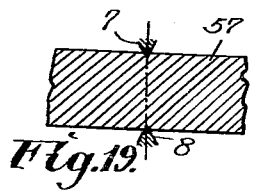
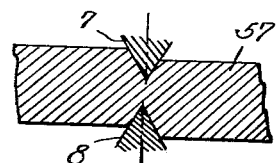
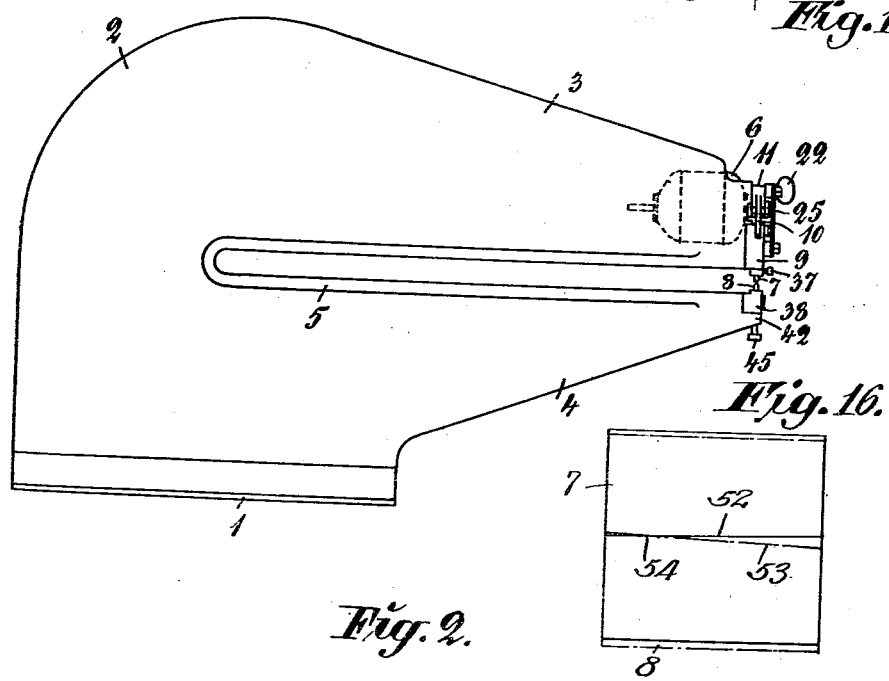
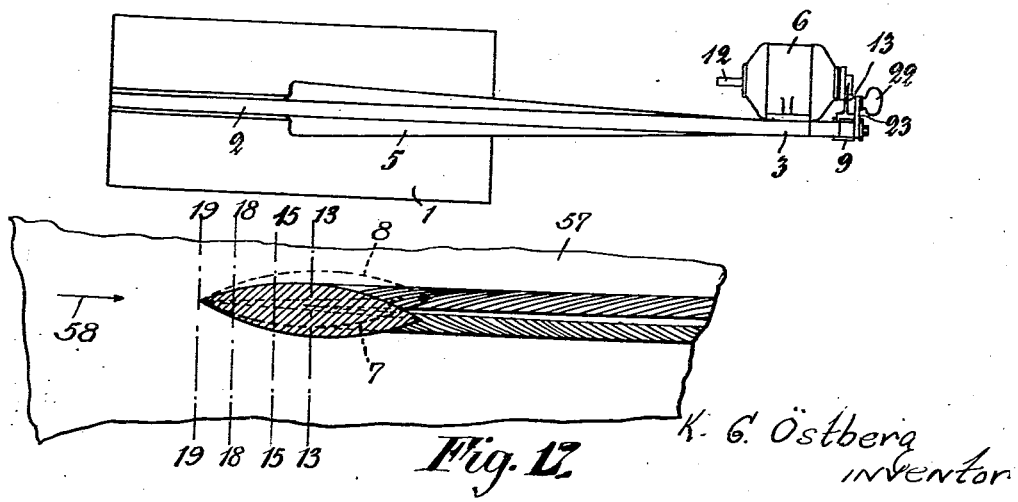
K. G. Östberg
INVENTOR
By Glascock Downing & Seebold
Attys Dec. 5, 1939.   K. G. ÖSTBERG   2,182,162
MACHINE FOR CUTTING OR SHEARING METAL PLATES AND THE LIKE
Filed Dec. 8, 1937   4 Sheets-Sheet 2
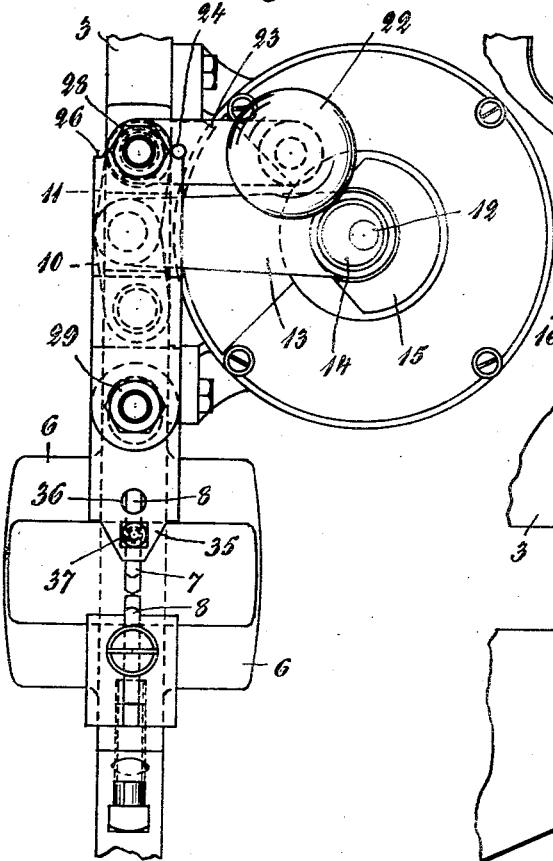
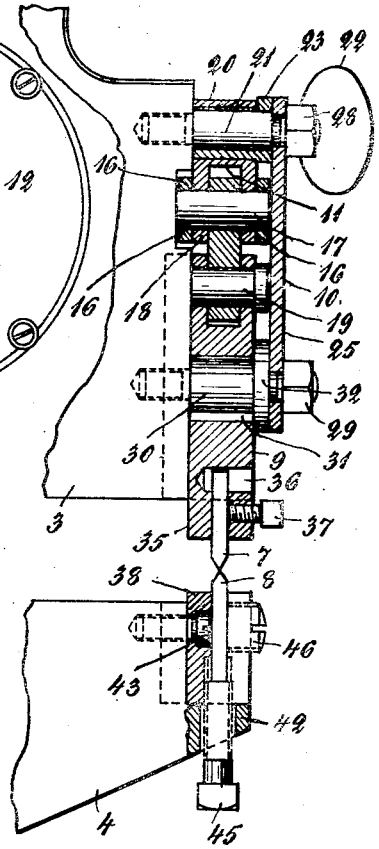
K. G. Östberg
INVENTOR
By Glascock Downing & Seebold
Attys.

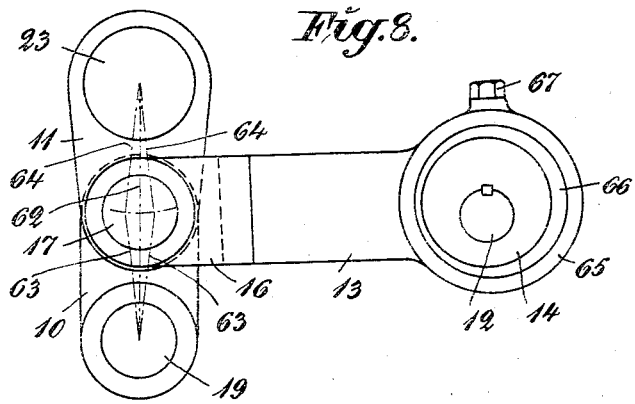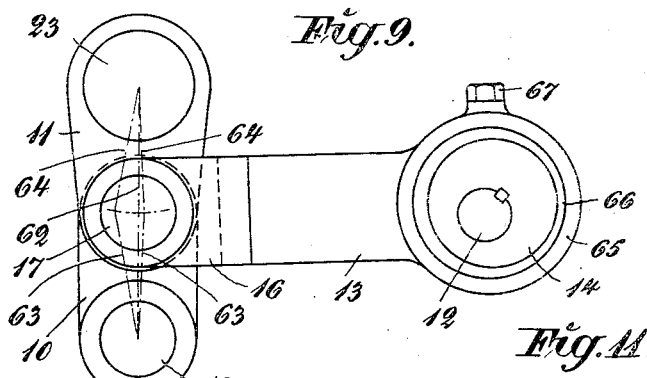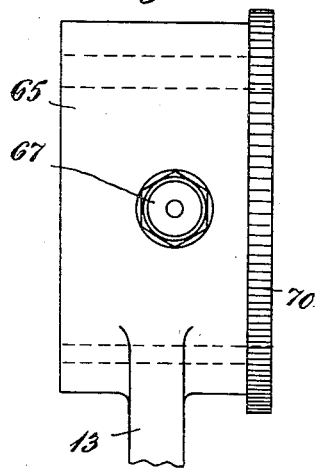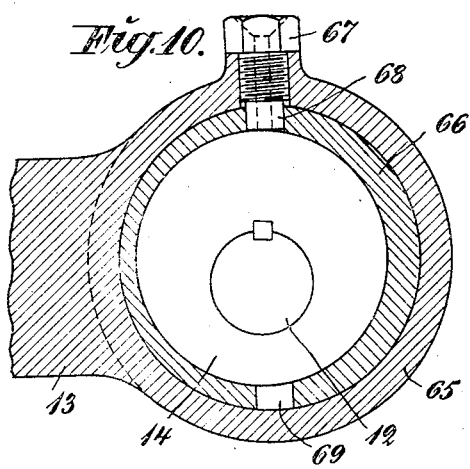

Dec. 5, 1939.　　　K. G. ÖSTBERG　　　2,182,162
MACHINE FOR CUTTING OR SHEARING METAL PLATES AND THE LIKE
Filed Dec. 8, 1937　　　4 Sheets-Sheet 4

K. G. Östberg
INVENTOR
By Glascock Downing & Seebold
Attys.

Patented Dec. 5, 1939

2,182,162

UNITED STATES PATENT OFFICE 2,182,162

MACHINE FOR CUTTING OR SHEARING METAL PLATES AND THE LIKE

Karl Gustaf Östberg, Stockholm, Sweden, assignor to Fabriksaktiebolaget Haldataxametern, Halmstad, Sweden, a company of Sweden Application December 8, 1937, Serial No. 178,787
In Sweden December 12, 1936

16 Claims. (Cl. 164—47)

The present invention relates to machines for cutting or shearing metal plates and the like, and it relates more particularly to machines of said kind comprising two cutting tools which are disposed at opposite sides of the plane of movement of the plate to be cut, and one of which at least is arranged to perform a reciprocating movement. The primary object of the invention is to provide a plate cutting machine of the kind referred to, whereby even comparatively thick and stiff metal plates can be severed along curves having a very small radius of bend. Cuts of such shape cannot readily be made by means of plate shears of hitherto known construction, in that in the known shears the cutting blades are arranged to operate in a common plane and, furthermore, possess plane and mutually parallel inside faces which engage with the sheared edges of the plate, thus forming a guide which interferes with the turning of the plate in respect to the cutting blades.

According to the present invention said drawbacks are overcome through such an arrangement of the cutting tools or cutters that the cutting planes thereof form an acute angle with each other, the cut being made through a combined upsetting and tearing action in the section of the cut, in that the cutters penetrate into the plate at opposite sides thereof forming grooves of successively increasing depth while at the same time subjecting the plate in the reduced section to lateral tensional stresses produced by the side pressures exerted on the edges of the cut by the wedge-shaped cutting tools. The cutting edges of the two cutters are then preferably arranged in such mutual relationship that the foremost portions of the active parts of the cutting edges will act upon the plate at opposed points, whereas the rear portions of the cutting edges will be spaced apart somewhat in a lateral direction. On account of the play thus existing between the two cutting planes, which play increases successively in width towards the rear part of the cutting edges, the plate can be turned through a comparatively large angle in the intervals between the different working strokes of the cutting tools without being hampered by the sheared-off edges of the plates. Since under such conditions the opposed sides of the cutting tools need not any longer be plane, said sides can advantageously be given a convexed shape, whereby the cutting in curves is further facilitated, in that the plate will then be guided to a certain extent when turned.

The invention will now be described more in detail having reference to the drawings attached to this specification and forming part thereof, said drawings showing a motor driven shearing machine according to the invention. In the drawings:

Figure 1 shows a side view of the machine, and Figure 2 a top view of the same.

Figure 3 shows, on a larger scale, a front view of the mechanism proper with the appertaining motor, and Figure 4 a side view of the machine, partly in section.

Figure 5 shows a top view of the lower tool holder, and Figure 6 shows the upper tool holder as viewed from below.

Figure 7 shows schematically a modified embodiment of the motion transmitting mechanism.

Figures 8 to 11 illustrate a mechanism for regulating the length of the stroke, in that Figures 8 and 9 show side views of a link system with an appertaining crank rod in two different setting positions, Figure 10 a section on a larger scale through that end of the crank rod which is journalled on the motor shaft, and Figure 11 a plan view of said crank rod end.

Figure 16 shows a cutting tool as viewed from the cutting end.

Figure 17 is a horizontal view showing a cut in the plate and the upper cutting tool in a horizontal section adjacent to the upper face of the plate.

Figure 18 is a section on the line 18—18 in Figure 17, and Figure 19 a section on the line 19—19 in Figure 17.

Figure 12:
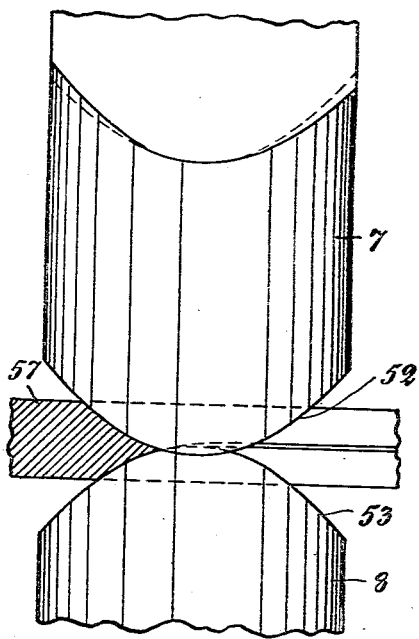
Figures 12 and 13 show the active portions of the cutting tools in side view and front view respectively.

The machine frame consists of a vertical frame plate 2 provided with a foot 1 and shaped to form two arms 3, 4 which at their front ends support the cutting tools or cutters and the appertaining driving mechanism. Between the arms 3, 4 there is a free space for the plate to be cut, which space is bounded by a strengthening rib 5 extending along the inner edges of the arms.

The driving mechanism comprises an electric motor 6 which is rigidly secured to the upper arm 3 at one side thereof and which serves to impart to the upper one of the two cutters 7, 8 a rapid reciprocating movement. For this purpose the upper cutter 7 is secured in a slide 9 which is movable up and down in the upper arm 3 of the frame plate 2 and is connected by means of toggle links 10, 11 with a crank rod 13 journalled eccentrically on the motor shaft 12. The crank rod 13, which together with the excenter 14 is balanced by means of a counter weight 15, is provided with a bifurcated end 16 and is pivotally connected with the toggle links 10, 11 by means of the pivot bolt 17 which couples the link 10 to the bifurcated end 18 of the link 11. At its lower end the link 10 is connected with the slide 9 by means of a pivot bolt 19, whereas the link 11 is journalled at its upper end on a fixed pivot bolt 20 through the intermedium of an eccentric sleeve 21 which can be set in two different positions by means of an arm 23 provided with a handle 22 for the purpose of raising and lowering the slide 9. In the position of the arm 23 shown on the drawing the mechanism takes up its lowermost position, the arm 23 then resting by means of a pin 24 on a stop provided on an end plate 25. The turning of the arm 23 to the left in Figure 3 through an angle of 180° will bring the pin 24 into engagement with a corresponding stop 26 at the other side of the end plate 25. The upper cutter 7 will then be raised from its working position shown in Figures 3 and 4, thereby permitting insertion of the plate to be cut between the two cutters 7 and 8. The end plate 25 is secured to the frame by means of a nut 28 screwed onto the pivot bolt 20 and also by means of a nut 29 arranged on the outer end of a guide pin 30 secured in the frame. Said guide pin passes through a slit-shaped recess 31 in the slide 9 and is provided with a flange 32 which by means of the slide 9 is held abutting against the outer end of the arm 3, said end being ground perfectly plane. The slide is also guided on the sides of the arm 3 by means of two overhanging edges 33, 34, Figure 6. The pivot pins 17, 19 are retained in their positions by the end plate 25. The mechanism can therefore readily be dismantled after removal of the latter.

The cutting tools or cutters 7 and 8 are shaped as chisels having a shank of rectangular or square cross section. The upper cutter 7 is secured in the lower part of the slide 9, said lower part being constructed as a tool holder 35. The tool is inserted from below into a square hole in the holder 35, until its inner end engages the side wall of a bore 36, whereafter it is locked in position by means of a screw 37. The lower cutter 8 is rigidly secured in the lower frame-arm 4 through the intermedium of a holder consisting of a detachable block 38 having a rectangular cross section and being provided at its rear side with a milled recess the bottom portion of which engages the end surface 39 of the frame-arm 4, Figure 5, and the side portions 40, 41 of which contact with the side surfaces of the arm. The block 38, which rests with its lower end on a projection 42 on the arm 4, is held in position by means of a screw 43 which engages in a threaded hole in the arm 4. At its front side the block 38 is provided with a slot 44. The cutter 8, which has the same width as the slot 44, is placed on the bottom of the slot so as to rest with its lower end on a set screw 45 inserted in the projection 42, whereafter it is locked in position by means of a screw 46. The screw 45 serves to regulate the height position of the cutter 8.

By means of the toggle links 10, 11 a reciprocating movement can be imparted to the upper cutting tool 7 in the longitudinal direction of the tool, said longitudinal direction coinciding with the longitudinal direction of the lower tool 8. For each revolution of the motor shaft 12 the pivot pin 17 is moved twice across the middle line of the toggle links, said pin then moving an equal distance both ways from the middle position. Consequently, the cutter 7 will make two strokes for each revolution of the motor. The motor can have a speed of 1000 to 2000 revolutions per minute or more. The length of the stroke depends on the plate thickness but is in each case smaller than the plate thickness. If desired, the length of the stroke can be further reduced by imparting to the lower cutter a reciprocating movement in unison with the movement of the upper cutter, both cutters being then preferably driven from the same motor.

Figure 7 shows schematically an arrangement through which the number of the working strokes for each revolution of the motor can be further increased. 10 and 11 are the two toggle links which in this case are coupled with a fixed part 47 in the frame by means of another pair of toggle links 48, 49 the pivot pin 50 of which is connected with the motor shaft through a crank rod 51 and an eccenter. The arrangement is such that the pivot pin 50 will pass across the centre line of the toggle links 48, 49 twice for each revolution of the motor, the number of strokes of the cutter consequently being equal to four times the number of revolutions of the motor. By including in similar manner one or more further pair of toggle links between the pivot pin 50 and the motor shaft the number of strokes for each revolution of the motor can be further increased.

In Figures 8 to 11 there is illustrated an arrangement providing for a regulation for different plate thickness of the cutting tool and/or the length of the stroke or the number of strokes per minute respectively for a given number of revolutions of the motor. In the embodiment previously described the movement transmission is so arranged that the toggle links 10 and 11 will swing out at opposite sides of a plane through the outer pivot pins 19, 23 of the links. In Figures 8 and 9 said plane is indicated with a dot and dash line 62, whereas the angles within which the links perform their swinging movement are marked with dot-and-dash lines 63 and 64 respectively. According to the previously described embodiment the arrangement is such that the links will turn through equal angles at both sides of said plane 62, the pivot pin 19 and thus also the cutting tool then performing two full strokes for each reciprocation of the crank rod 13, i. e. for each revolution of the motor shaft. In the embodiment according to Figures 8 to 11, on the other hand, provisions are made rendering possible a variation of the extent of the turning movement of the links in respect to said plane 62. For said purpose the crank rod is provided in the shown embodiment with an eccentric sleeve 66 inserted in the crank rod head 65, said sleeve being shiftable to different angular positions in such a manner that the effective length of the crank rod can be varied. To facilitate the turning of the sleeve the latter is provided at one side with a knurled annular flange 70. As shown most clearly in Figure 10, the eccentric sleeve 66 forms at the same time a bearing bushing for the crank pin which in the shown example consists of an eccentric disc 14 keyed onto the motor shaft 12. The sleeve 66 is held in position in the head 65 by means of an oil cup or oil nipple 67 which by means of a pin-shaped extension 68 engages with a drilled hole in the sleeve 66.

The effective length of the crank rod is determined by the distance between the geometrical axis of the end pin 17 and the centre axis of the eccentric disc 14. According to the invention said distance can be varied through angular displacement of the eccentric sleeve 66. In the shown example said sleeve is adapted to be set in two different positions displaced an angle of about 180° in respect to each other. For said purpose the sleeve 66 is provided with two bores 69. In the position of the sleeve shown in Figures 8 and 10 the links will turn on their pivot pins 19 and 23 through equal angles on both sides of the plane 62 in similar manner as in the embodiment described above. When it is desired to shift the sleeve 66 from the position shown in Figures 8 and 10 to the other setting position, the oil cup 67 is first unscrewed. After the sleeve has been turned through an angle of about 180° the oil cup 67 is again screwed into place, so that its pin 68 will engage with the other recess 69 in the sleeve. Through this operation the effective length of the crank rod has been increased so that the links 10, 11 will now swing within the angles marked in Figure 2 with the dot and dash lines 63, 64. As will be clear from Figure 9 the links will then move substantially only at one side of the plane 62, the stroke of the pin 19 then becoming greater than in the setting position shown in Figure 8. In the setting shown in Figure 9 the pin 19 will move back and forth once for each reciprocation of the crank rod 13. The number of strokes per minute will thus in said case be only half the number obtained in connection with the setting according to Figure 8 for the same speed of the motor. For practical reasons the angular displacement of the sleeve 66 is made somewhat smaller than 180° so that during its movement to the left in Figure 9 the pivot pin 17 will pass somewhat past the plane 62.

With the aid of the mechanism described the length of the stroke of the cutting tool can be regulated with regard to the thickness of the plate to be cut so that a greater length of the stroke can be used when shearing or cutting thicker plates. When the length of the crank rod is adjusted in accordance with Figure 8 the machine can be used for example, for shearing plates of a thickness up to 2 millimeters. After adjusting the length of the crank rod in accordance with Figure 9 thicker plates up to a thickness of about 4 millimeters can be sheared, the number of strokes for a certain speed of the motor being then at the same time reduced with one half, due regard being thereby taken to the greater shearing work required to sever the thicker plate, so that overloading of the motor is prevented.

The desired change of the length of the stroke and of the number of the strokes can also be brought about otherwise than shown in Figures 8 to 11. Thus, the eccentric sleeve 66 can be arranged instead in the other crank rod bearing on the pivot pin 17. In some cases the crank rod proper can be composed of two parts which are displaceable in relation to each other in the longitudinal direction of the crank rod in such a manner that the effective length of the crank rod can be varied by shifting said parts.

The shape of the cutting tools will be clear from Figures 12 to 16. The cutting edges of the tools are formed by grinding the ends of the cutting tools along two bent surfaces, preferably of cylindrical shape, the axis and generatrixes of said cylindrical surfaces forming with each other an acute angle which is equal to the cutting angle of the cutting edges. The cutting edges proper 52, 53 will then get the shape of a bent or arcuate line having its top point positioned approximately at the middle of the respective cutting edge. The inclination of the side surfaces forming the cutting edge is preferably so selected that the edge line 52 or 53 respectively will be positioned in a plane which is parallel with the longitudinal direction of the cutting tool. The last mentioned plane constitutes the cutting plane of the tool with respect to the plate. The cutting planes of the pair of tools are so positioned according to the invention as to form an acute angle with each other, the two planes intersecting each other in a line which passes through points on the active parts of the cutting edges, as shown in Figure 16. The latter figure shows in full lines the upper cutter 7 as viewed from below and shows with dotted lines the lower cutter 8 in a corresponding projection. As will be seen from the figure the cutting planes passing through the edge lines 52, 53 of the cutting edges form a small angle with each other and intersect each other in points 54 on said lines which are positioned in the fore portions of the cutting edges reckoned in the cutting direction. The cutting edges of both cutting tools are ground to the same shape, wherefore in both tools the plane through the edge line of the cutting edge will form the same angle with the plane side surfaces of the shank, said angle being equal to half the angle between the two cutting planes. From Figures 13, 15 and 16 it is also clear that both sides 55, 56 of the cutting edge are inclined in respect to the cutting plane. In the shown example both sides of the cutting edge form the same angle with the cutting plane.

Figure 13:
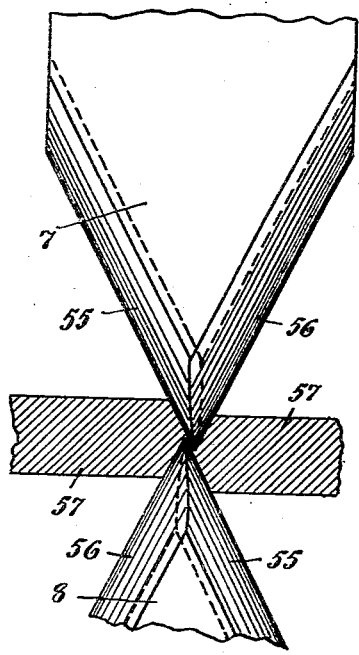
Figure 14:
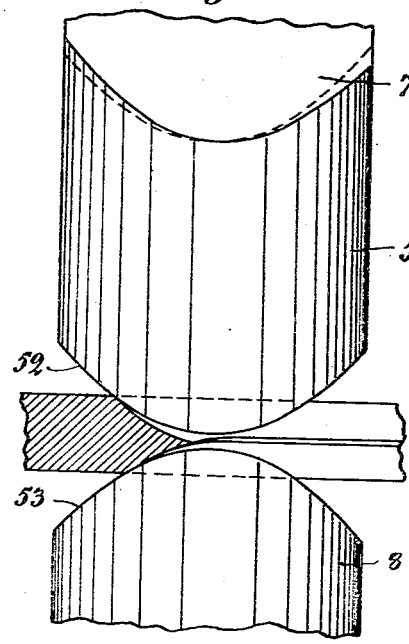
Figures 14 and 15 are similar views of the cutting tools with the tools occupying other mutual positions.
Figure 15:
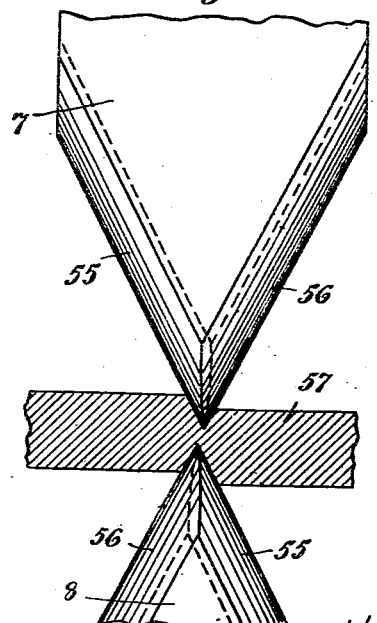

The shearing can be started at an arbitrary point of the plate 57, Figure 17, either at the edge or inside the same. After the motor has been started and the upper cutter 7 moved to its idling position by swinging over the arm 23 to the left according to Figure 3 the plate is inserted in working position, whereafter by turning back the arm 23 the cutter 7 is lowered into engagement with the plate at the point where cutting is to start. When the upper cutting tool performs its downward stroke under the action of the motor the cutting edges of the two cutters will penetrate into the plate at opposite sides of the latter in the manner illustrated in Figures 12 and 13, said figures showing the relative positions of the cutters at the moment when the toggle links 10, 11 are passing their middle positions. Impressions or grooves having the same shape as the cutting edges are then formed in the plate. When thereafter the tool 7 moves upwards the plate 57 is displaced in the direction of the arrow 58 in Figure 17 under the action of the feeding pressure until the cutting edge of the upper cutter engages with the fore part of the upper groove in the plate. The plate and the cutting edges will then take up the relative positions shown in Figures 14 and 15, Figure 15 showing the plate in section on the line 15—15 in Figure 17. When thereafter the upper tool 7 moves downwards again, its fore edge will make a new impression or groove while at the same time the portion of the cutting edge lying immediately behind said fore cutting edge will cause a further deepening and lateral extension of the previous impression, as will be clear from the sections through different points of the cut shown in Figures 13, 15, 18, and 19. Since the tool operates with a relatively small length of the stroke, said working of the plate for each stroke of the tool will be comparatively small. According as the plate is fed forward the thickness of the plate will be made successively thinner in the cutting line, while simultaneously the cutting edges will exert comparatively great horizontal side pressures on the edges of the cut. The plate will thus be subjected to a combined severing and wedging action resulting in that finally the thinnest portion of the plate will be torn apart. This occurs already before said portion reaches the middle points of the cutting edges. The top portions of the cutting edges, which overlap each other somewhat when the upper cutting tool is in its lowermost position, thus only serve to widen the cut already completed in front of said portions. As will be clear from the plate sections shown in Figures 13 and 15 the plate edges at opposite sides of the cut will not be appreciably displaced vertically in relation to each other through the action of the cutting tools. Said condition depends substantially thereon that according to the present invention also the adjacent insides of the cutting edges are inclined in respect to the cutting plane, this arrangement preventing the pure shearing action upon the plate with attendant mutual displacement of the edges of the cut in the vertical plane which is caused when using ordinary plate shears where the insides of the cutting edges are substantially parallel with the cutting plane. On the contrary, the edges of the cut will be forced apart in the horizontal plane under the action of the side pressures exerted by the cutting edges. The cutting angle of the cutters, i. e. the angle between the side surfaces 55, 56 of the cutting edge, can be selected between 50° and 80° depending upon the material and thickness of the plate to be cut.

In order that the cutters shall be able to work in the above described manner it is, of course, of importance that in a vertical plane the active ends of the cutting edges are inclined with respect to each other and to the plate and that the length of the stroke is such that the distance between the top portions of the cutting edges will never become greater than the thickness of the plate, so that even when the movable cutting tool takes up its uppermost position the forward feed of the plate shall be limited by the cutting tools engaging the limiting surfaces of the impressed grooves. In a plate cutting machine according to the invention the length of the stroke should therefore always be smaller than the thickness of the plate, for example equal to about half the plate thickness, the tops of the cutting edges then overlapping each other only slightly in the lowermost position of the movable cutting tool, as shown in Figures 12 and 13. Since during the shearing operation the cutting tools need not support each other, as is the case in shears of ordinary construction, it is not necessary that the rear inactive side portions of the cutting edges overlap each other, wherefore the corresponding portions of the cutting edges may diverge, said portions being preferably given the same shape as the active side portions. By turning the cutting tools in their holders through an angle of 180° the two halves of the cutting edges can therefore be used alternately as active edges.

When shearing or cutting relatively thick plates the cutting tools need not penetrate so far into the plate to effect severence as when thinner plates are being cut. It has thus been found that a break in the section of the cut can occur already before the cutting edges have penetrated to a depth corresponding to half the plate thickness. If the plates are, for instance, 3 millimeters thick the break can occur when the grooves at opposite sides of the plate have reached a depth of only 1 millimeter so that the remaining thickness of the material in the break proper will be one millimeter only. It is therefore evident that the overlapping of the tops of the cutting edges in the bottom position of the tools can be further reduced when it is desired to sever thicker plates, and that in some cases the cutting edge need not overlap at all. For this reason the angle between the cutting planes of the cutters can also be made smaller when thicker plates are to be cut.

I claim:

1. A plate shearing machine having two chisel-shaped cutting tools one of which of least is adapted to perform a reciprocating movement, and in which the cutting tools are angularly displaced relatively to one another so that the cutting planes of the cutting edges will diverge at an acute angle in the direction of feed of the plate to be cut.

2. A plate shearing machine having two chisel-shaped cutting tools one of which at least is adapted to perform a reciprocating movement, and in which the cutting tools are angularly displaced relatively to one another so that the cutting planes of the cutting edges will diverge at an acute angle in the direction of feed of the plate to be cut and will intersect along a line passing through points on the front portion of the cutting edges.

3. A plate shearing machine as claimed in claim 1 in which the outer one of the two surfaces of each cutting tool which define the cutting edge, forms an acute angle with the cutting plane of the tool.

4. A plate shearing machine as claimed in claim 1 in which both of the two surfaces of each cutting tool which define the cutting edge form an acute angle and about an equal angle with the cutting plane of the tool.

5. A plate shearing machine as claimed in claim 1, in which the inner one of the two surfaces of each cutting tool which define the cutting edge has a convex cylindrical shape.

6. A plate shearing machine as claimed in claim 1, in which the cutting edge of each cutting tool is formed by two convex, cylindrical surfaces which intersect.

7. A plate shearing machine as claimed in claim 1, in which the cutting edge of each cutting tool is formed by two convex, cylindrical surfaces which intersect and the axis of which are positioned in a plane which forms right angles with the cutting plane of the tool.

8. A plate shearing machine as claimed in claim 1, in which the cutting edge of each cutting tool is formed by two convex, cylindrical surfaces which intersect and the axis of which are positioned in a plane which forms right angles with the cutting plane of the tool and with the plane of feed of the plate to be cut.

9. A plate shearing machine as claimed in claim 1, in which the cutting tools are shaped as rods having a rectangular or square cross section the cutting edge being positioned in a plane which forms an acute angle with the side surface of the rod.

10. A plate shearing machine as claimed in claim 1, in which the cutting tools are shaped as rods having a rectangular or square cross section the cutting edge being positioned in a plane which forms an acute angle with one of the side surfaces of the rod said angle being equal to half the angle between the cutting planes of the two cutting tools.

11. A plate shearing machine comprising a frame having an upper, horizontally projecting arm, two cutting tools, a tool holder for one of said tools slidably arranged at the outer end of said frame-arm, and driving means for said tool holder comprising a motor, a crank rod and a pair of toggle links the latter being mounted on said frame-arm so as to swing in a plane at right angles to the longitudinal direction of the frame-arm.

12. A plate shearing machine comprising a frame having an upper horizontally projecting arm, two cutting tools, a tool holder for one of said tools slidably arranged at the outer end of said frame-arm and driving means for said tool holder comprising a motor mounted on the frame-arm at one side thereof and with its driving shaft parallel therewith, a crank rod and a pair of toggle links the latter being mounted on said frame-arm so as to swing in a plane at right angles to the longitudinal direction of the frame-arm.

13. A plate shearing machine comprising two cutting tools, a tool holder for one of said tools, means for reciprocating said tool holder comprising a motor driven shaft, a motion transmission device and two toggle links one of which is pivotally connected with said tool holder, and adjusting means associated with the motion transmission device for changing the angular lateral displacements of the toggle links so as to cause the links to swing either at opposite sides or only at one side of the middle position of the links.

14. A plate shearing machine comprising two cutting tools, a tool holder for one of said tools, means for reciprocating said tool holder comprising a motor shaft, two toggle links one of which is connected with said tool holder, and a crank rod connecting said motor shaft with the toggle links, and means associated with said crank rod for changing its effective length.

15. A plate shearing machine as claimed in claim 14, in which an eccentric bushing is inserted in one bearing of the crank rod, said bushing being adapted to be set in different angular positions.

16. A plate shearing machine as claimed in claim 14, in which an eccentric bushing is inserted in one bearing of the crank rod and angularly displaceable therein, and in which an oil cup is inserted in said bearing and adapted to lock said bushing in adjusted position in relation to the bearing.

KARL GUSTAF ÖSTBERG.